3,034,117
VIDEO INTENSIFICATION SYSTEM
Walter R. Tower, Jericho, Howard J. Strauss, Astoria, and Constantine A. Tereszkiewicz, Glen Oaks Village, N.Y., assignors to Sperry Rand Corporation, a corporation of Delaware
Filed Apr. 3, 1958, Ser. No. 726,218
10 Claims. (Cl. 343—11)

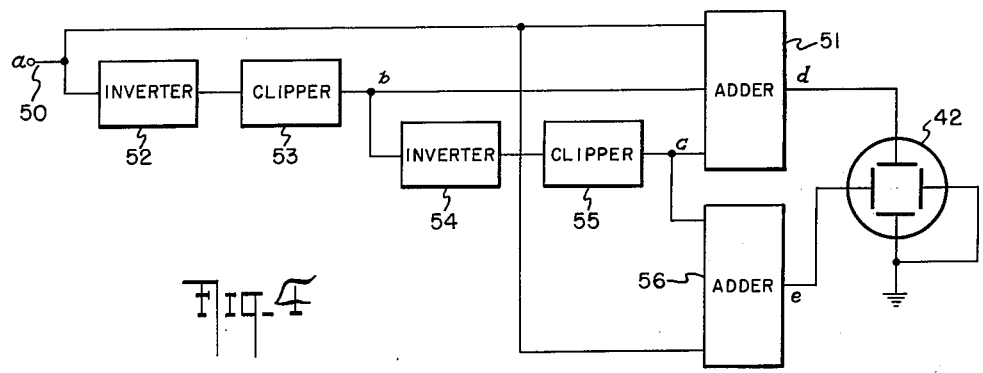
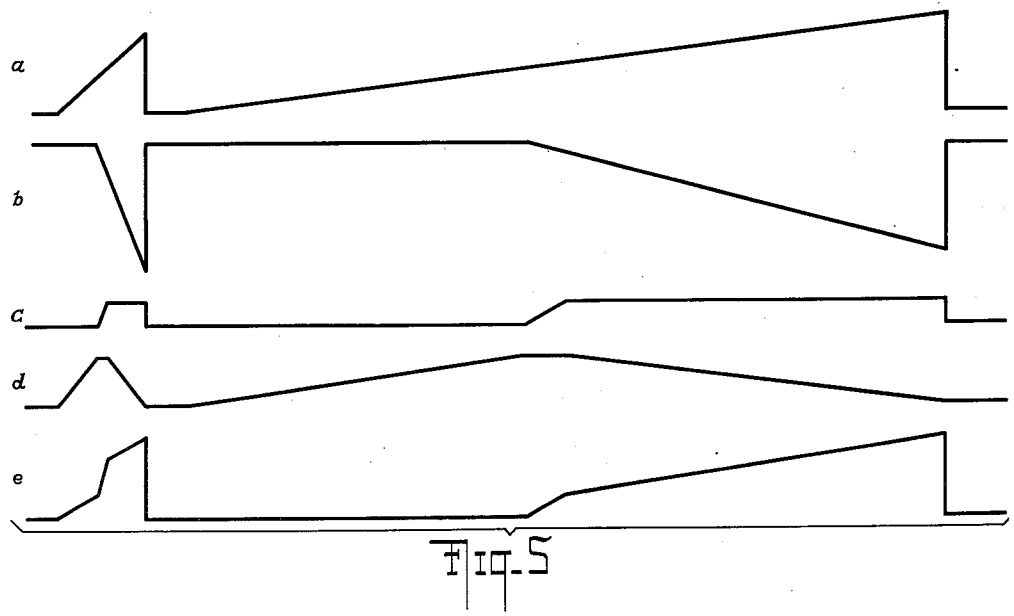
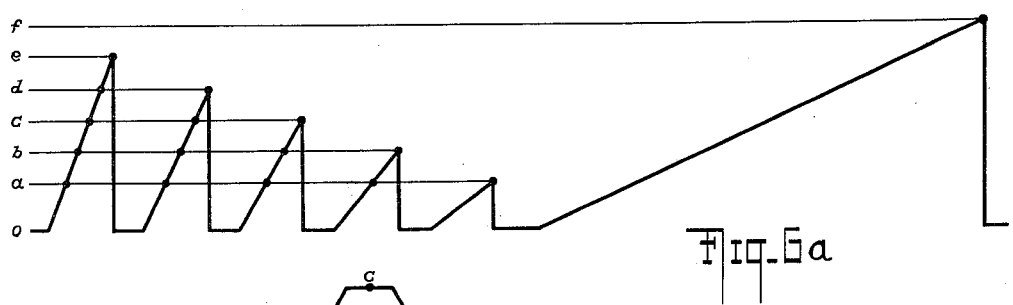
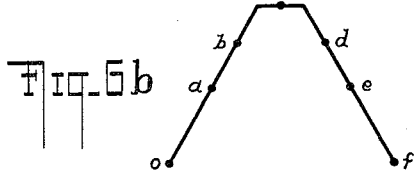
INVENTORS
W.R. TOWER
H.J. STRAUSS
C.A. TERESZKIEWICZ
BY
ATTORNEY

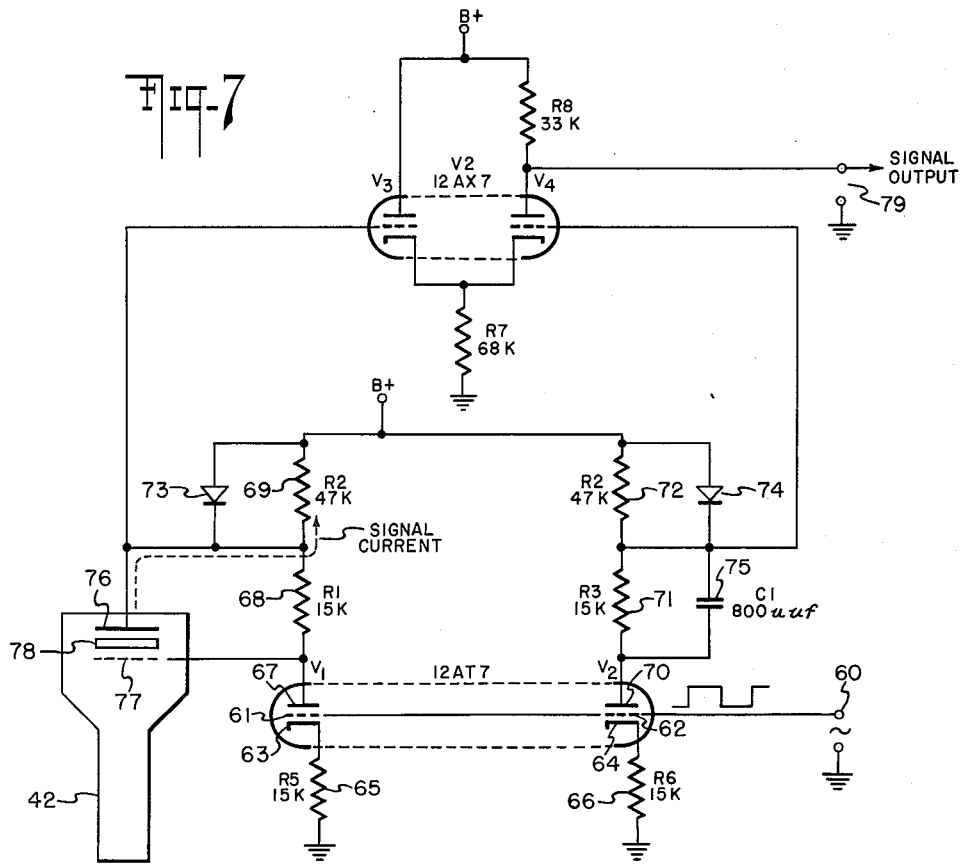
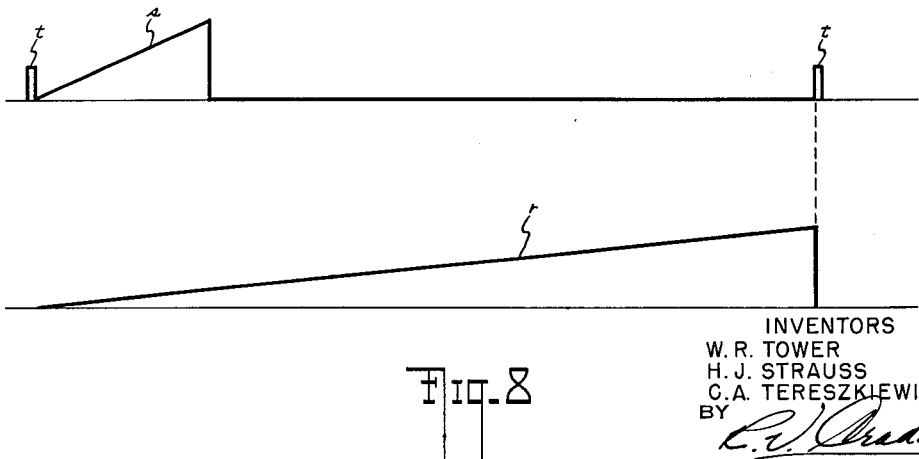

This invention relates to cathode-ray tube display systems and more particularly the invention is concerned with novel means for increasing the light intensity in such display systems.

The light intensity of a cathode-ray tube display in a radar system, for instance, is in general dependent upon the average rate at which electron energy impinges on a unit area of the display screen phosphor and upon the number of video pulses corresponding to a given target which are displayed in a given time interval. Consequently, the intensity of the display is often quite low whenever high electron-beam scanning speeds or time sharing of the display means among several radar data inputs are required in a system. One solution to the problem of increasing the light intensity of a cathode-ray tube display lies in the possibility of decreasing the speed at which the electron beam moves across the display screen phosphor. This can be done by utilizing a storage device. The information received by the radar is first recorded in a storage tube. The information is then transferred to the cathode-ray tube in such a manner that the speed at which the cathode-ray beam displays the picture on the screen phosphor is effectively decreased. This technique is possible whenever "dead-time" (time during which video signals are not ordinarily received due to range or time sharing considerations) exists in a system.

Although the present invention is not limited in its use to this specific application, the invention is particularly useful in, and will be discussed in connection with, a "stacked-beam" radar wherein the video display is to present target information in terms of ground range. In such a radar the antenna is comprised of a plurality of radiators which are inclined at different elevation angles. A pulse of radio frequency energy provided by the transmitter of the system is divided among the different radiators in a prescribed manner and is simultaneously radiated into space by the different radiators in a plurality of stacked-elevation beams. A plurality of receivers are connected, respectively, to the radiators and provide output signals in response to pulses of reflected energy which are received by the different radiators. One possible way of operating the video indicating portion of such a system would be to couple a different one of the receivers to the cathode-ray tube indicator after each transmitted pulse in order to display successively the targets present in each of the radiating beams. That is, one cathode-ray tube indicator is time-shared between the plurality of receivers. For example, if a stacked-beam radar had five beams it would also have five receivers and each receiver would be monitored, and its received signals displayed, only once every five repetition intervals. As pointed out above, the intensity of the video display on a cathode-ray tube is dependent upon the number of video pulses corresponding to a given target which are displayed in a given time interval. Therefore, in this example, the number of hits on the phosphor of the cathode-ray tube would be decreased by five, or the "dead-time" would be increased by the factor of five. This would result in a reduction of the video intensification by a factor of five.

The same problem of course would exist in a radar system wherein the pulse repetition interval is quite long compared with the time required for an echo signal to be received from the most distant target of interest.

The reduction in video intensification of the cathode ray tube indicator which would result from the above type of operation is overcome in the present invention by sampling the output signals from a different one of the receivers during successive intervals of time between transmitted pulses, respectively, and storing the signals on the storage surface of a first storage tube. Throughout the entire period of time required to sample all the receivers once the signals which were previously stored in a similar manner in a second storage tube are simultaneously read off and transferred to the cathode-ray tube indicator. During the storage period of the respective storage tubes their electron beams are swept over a different length of a single storage path on the storage surface of the tube each time a different receiver is sampled, and throughout the period when the stored signals are read off the respective tubes their electron beams are caused to make a single sweep over the entire length of the storage path. This results in an increase in the intensification of the video display over the system described above by a factor equal to the ratio of the velocity of the storage tube electron beam during the storage of signals to the velocity of the storage tube electron beam during the read-off period.

Because the display is in terms of ground range information, the length of the path along which the signals from any given receiver are stored is a cosine function of the elevation angle of the radiated beam which is coupled to that receiver.

The storage tubes sequentially operate in this manner, one storing signals from the successively sampled receivers while at the same time signals are read off the other tube and are displayed on the cathode-ray tube indicator whose electron beam sweeps the display screen at the same rate as the read-off beam sweeps of the storage tubes. Since the intensity of the cathode-ray tube display varies inversely as the speed of its sweep, the gain in intensity is approximately equal to the ratio of the speed of storage sweeps to the speed of the read-off sweeps, providing, of course, that only one storage sweep occurs during the display interval.

It is therefore an object of this invention to provide an improved cathode-ray tube display system.

It is a further object of this invention to provide an improved storage system for use in a cathode-ray tube display system.

Another object of this invention is to provide an improved video display in a stacked-beam radar system.

Another object of this invention is to provide an improved video display in a stacked-beam radar system.

A further object of the invention is to provide improved means for increasing the light intensity of a cathode-ray tube display.

Still another object of this invention is to provide improved means for storing signals at a fast rate in a storage means and reading out the stored signals and displaying them on a display means at a slower rate.

Other objects and a fuller understanding of the invention may be had by referring to the following description and claims, taken in conjunction with the accompanying drawings in which:

FIG. 4 is a block diagram of the sweep chopper circuit employed in the storage system of FIG. 2;

FIG. 5 is a graph showing the waveforms of the voltages present in the circuits of FIG. 4;

FIG. 6 shows a graph of the radar sweep voltages occurring during the sampling of the receivers in the stacked-beam radar system, and also illustrates the different lengths of the storage path traversed by a storage tube electron beam during the occurrences of the different radar sweep voltages;

FIG. 7 is a schematic diagram of the read-write switching circuit employed in the storage means of this invention, and FIG. 8 illustrates the relationship between a radar sweep voltage and a read-off sweep voltage in a single-beam radar system in which the present invention may be practiced.

Figure 1:
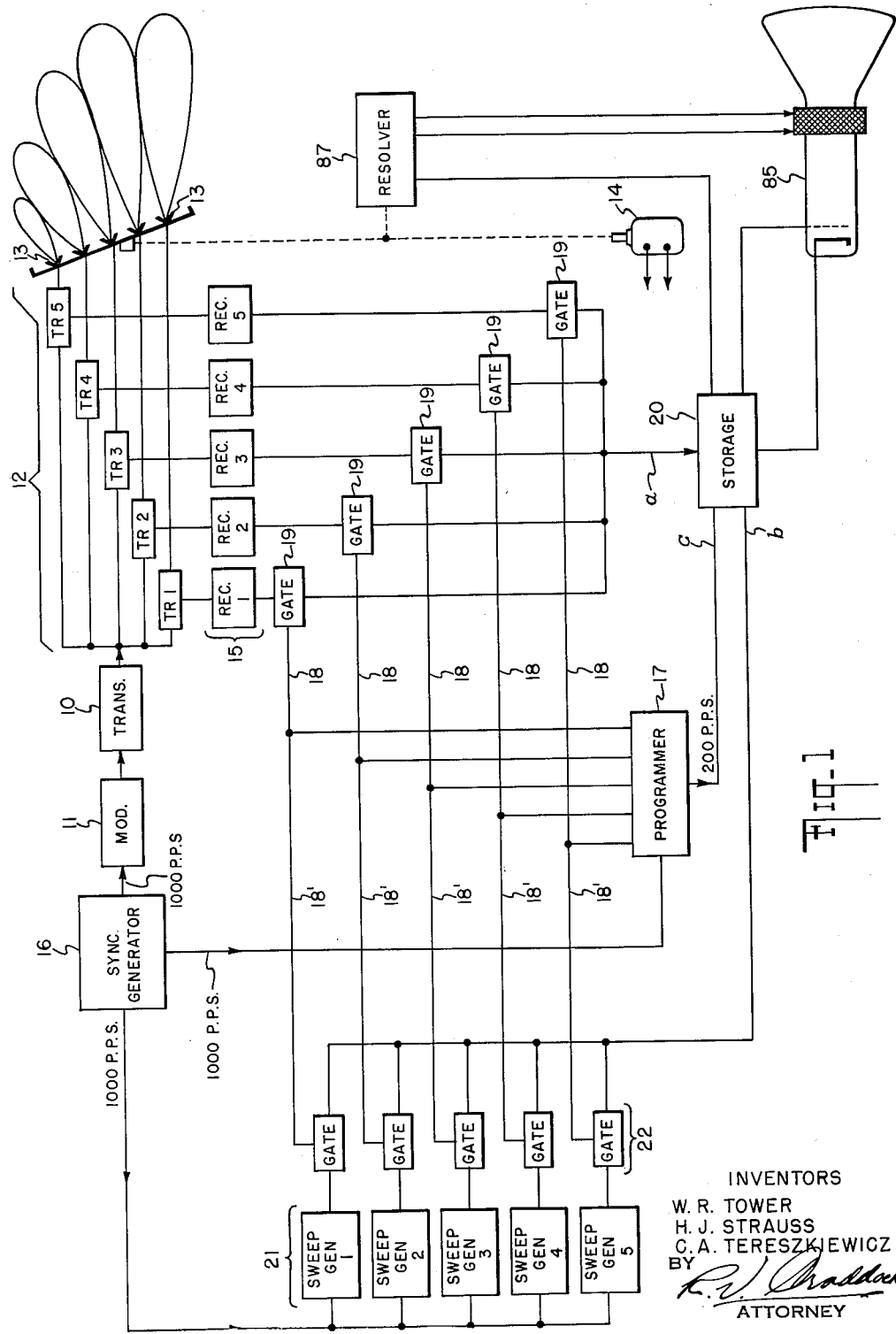
FIG. 1 is a block diagram showing the novel display intensification means of this invention employed in a stacked-beam radar system.

Referring now to FIG. 1, transmitter 10 is keyed at a repetition rate of 1,000 cycles per second, for example, by modulator 11 and produces pulses of radio frequency energy which are coupled to stacked-beam antenna system 12. Antenna system 12 is comprised of a plurality of radiators 13 each having a different elevation angle. Pulses of energy from transmitter 10 are divided in a predetermined manner among radiators 13 which simultaneously radiate the energy into space in a plurality of vertically-stacked beams. Radiators 13 may be rotated as a unit about a vertical axis by motor 14. The specific number of radiators employed in this discussion is illustrative only, since more than five radiators may be employed in practice if so desired. Pulses of energy reflected from objects in space located in the individual radiated beams returned to the corresponding radiator and are coupled to the respective receivers 15. Conventional transmit-receive devices in antenna system 12 perform their usual function to isolate the receivers from the transmitter during the transmission of energy from the radar and to isolate the transmitter from the antenna during the intervals of time between transmission.

Sync generator 16 supplies pulses at the transmitter pulse repetition rate to modulator 11, and also provides pulses at the same repetition rate to programmer 17.

Programmer 17 supplies timing pulses at a repetition rate of 1,000 pulses per second in sequence over leads 18 to gates 19. These timing pulses cause gates 19 to sequentially open and close in a predetermined order thus connecting a different one of the receivers 15 to storage means 20 after each transmitted pulse. Thus each of the receivers 15 is gated at a rate of 200 times a second.

Simultaneously, programmer 17 also provides pulses at a repetition rate of 1,000 pulses per second in sequence over the leads 18' which are coupled to gates 22.

Pulses at the radar repetition frequency are also supplied by sync generator 16 to each of the sweep generators 21. Each of the sweep generators 1 through 5 generates a sawtooth radar sweep voltage in response to each pulse from sync generator 16. Gates 22 operate in a manner similar to gates 19 and sequentially open and close to pass a radar sweep voltage from a different sweep generator after each transmitted pulse.

Programmer 17 may take the form of any one of a number of well known circuits which provide a succession of output pulses in a predetermined order to different circuits in response to a succession of pulses on a single input lead. Circuits of this type are commonly called pulse distributor, or electronic commutator circuits and are well known to those skilled in the art. Programmer 17 operates in a manner so that each time one of the gates 19 opens and couples one of the receivers 15 to storage means 20 a corresponding one of the gates 22 opens and passes a sawtooth radar sweep voltage to storage means 20. For instance, receiver 1 and sweep generator 1 are coupled to the storage means at the same time, and receiver 2 and sweep generator 2 are coupled to the storage means at the same time, and so on until all of the receivers and sweep generators have been coupled to the storage means 20, after which the sequence is repeated.

The amplitude of a sweep voltage occurring during the sampling of a given receiver is a function of the elevation angle of the radiator which is coupled to that receiver. For example, in FIG. 1 the amplitude of the sweep voltage from sweep generator 1 is a function of the elevation angle of the bottom-most radiator, which is coupled to receiver 1, and the amplitude of the sweep voltage from sweep generator 5 is a function of the elevation angle of the upper-most radiator, which is coupled to receiver 5. In the present discussion it is assumed that the video display on the cathode-ray tube is to be in terms of ground range information, in which case the amplitudes of the individual sawtooth radar sweep voltages will be proportional to the cosine of the elevation angles of the corresponding beams.

Programmer 17 also supplies sync pulses at a repetition rate of 200 pulses per second to storage means 20 on lead c.

An example of a type of storage tube which may be employed in this invention is an RCA "Radechon" (No. 6499) barrier grid storage tube. For a detailed explanation of the construction and operation of this storage tube the reader is referred to the following articles which appear in the RCA Review, volume 16, June 1955: "The Radechon, A Barrier Grid Storage Tube," page 197; "Discharging An Insulator Surface By Secondary Emission Without Redistribution," page 216; and "Radechon Storage Tube Circuits," page 234.

Briefly stated, this storage tube is one in which information is stored on a mica target in the form of electrical charges. The tube has a single electron gun whose construction is similar to that of a cathode-ray tube. The electron beam is directed through a barrier grid and onto the mica storage surface. The position of the electron beam is controlled by a pair of electrostatic deflection plates. The voltage difference between the mica storage surface and the barrier grid controls the secondary emission ratio from the mica surface, making the ratio either greater than or less than unity. In this manner an electric charge can be either added or removed at any point on the mica surface. The stored charges are capacitively coupled to the output circuit. In this tube reading is also an erasing action.

Figure 2:
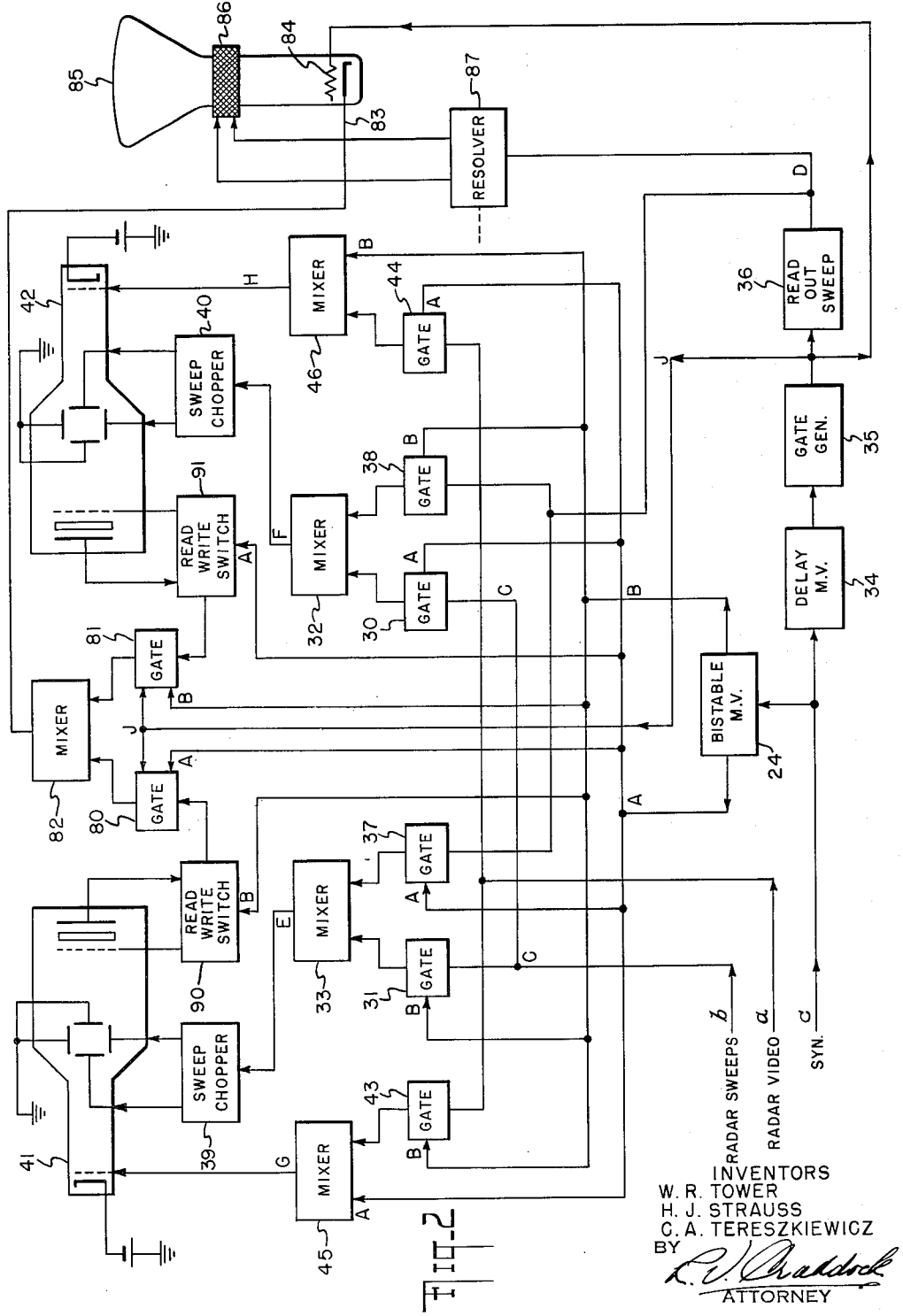
FIG. 2 is a block diagram showing in detail the novel storage system of this invention.
Figure 3:
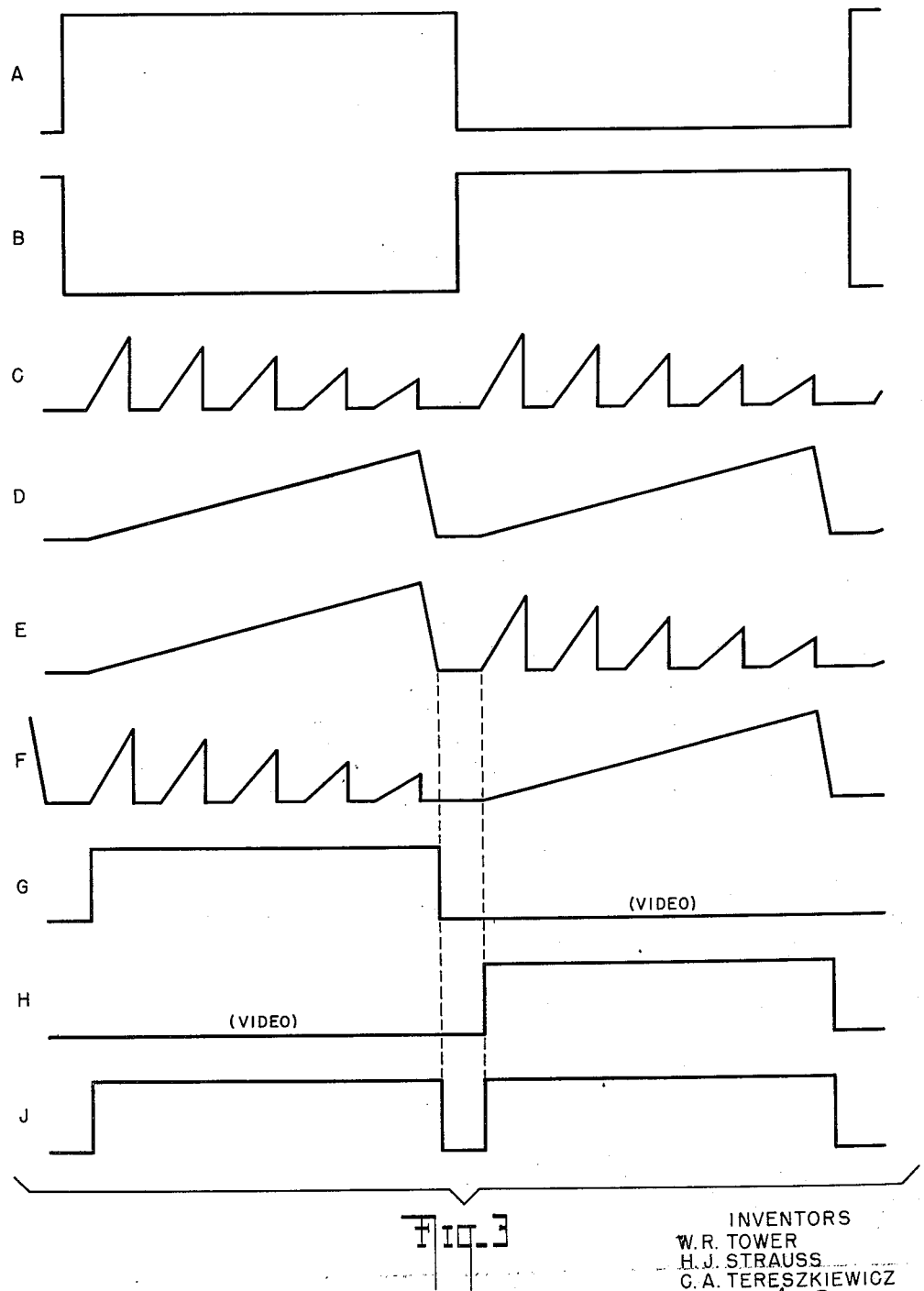
FIG. 3 is a series of graphs showing the waveforms of different voltages present in the circuit of the storage means of this invention.

For a detailed explanation of the operation of storage means 20, reference is made to FIGS. 2 and 3 wherein the radar video from the gated receivers 15, the radar sweeps from the gated sweep generators 21, and the sync pulses at a repetition rate of 200 pulses per second from programmer 17 are coupled to the storage means circuit on leads a, b and c, respectively.

*Storage Tube Sweep Voltages*

Sync pulses on lead c are coupled to bistable multivibrator 24 which produces two rectangular waveforms, A and B of FIG. 3, wherein the positive and negative portions of the waveforms each have a time duration substantially equal to the period of time required to sequentially sample all of the receivers once. In the example assumed it will be the total period of time between six successive transmitted pulses. Throughout the discussion which follows the term "storage period" will denote a period of time having the duration just described.

Waveform A and the radar sweep voltages on lead b, FIG. 3C, are coupled to gate 30 which operates only during the positive portion of waveform A to pass the sweep voltages occurring during the first of two successive storage periods. During the next succeeding storage period gate 30 is closed and there is no output therefrom.

Waveform B from bistable multivibrator 24 and the radar sweep voltages C are coupled to gate 31 which operates during the positive portion of waveform B to pass sweep voltages occurring during the second storage period. Because waveforms A and B are of opposite polarities during any given storage period, gate 30 will pass sweep voltages to mixer 32 during a first storage period and gate 31 will pass sweep voltages to mixer 33 during the next succeeding storage period.

Delay multivibrator 34, a one-shot multivibrator, is actuated by the sync pulses on lead c and produces output pulses whose starting times are delayed with respect to the sync pulses. Output pulses from delay multivibrator 34 trigger gate generator 35, another one-shot multivibrator, whose output pulses actuate read-out sweep circuit 36 which produces sawtooth sweep voltages, FIG. 3D, whose starting times are delayed, a short time with respect to the starting of the sync pulses, as will be more fully explained hereinafter.

Read-out sweep voltage D and voltage waveform A from bistable multivibrator 24 are coupled to gate 37 which operates only on the positive portions of waveform A to pass the read-out sweep waveform D to mixer 33. Since gates 37 and 31 operate during alternate successive storage periods the output of mixer 33 will be comprised of the waveform D during a first storage period and the waveform C during the next succeeding storage period, substantially as shown in FIG. 3E.

In a similar manner waveform B from bistable multivibrator 24 and the waveform D from read-out sweep generator 36 are coupled to gate 38 which operates during the positive portion of waveform B to pass the read-out sweep voltage D. The successively occurring outputs of gates 30 and 38 are combined in mixer 32 and produce the waveform of FIG. 3F. It will be noted that the radar sweep voltages and the read-out sweep voltages occur during opposite storage periods in the waveforms E and F.

The output of mixers 32 and 33 are coupled to sweep chopper circuits 40 and 39, respectively, which produce the sweep voltages for storage tubes 42 and 41.

Sweep chopper circuits 39 and 40 operate in response to the radar sweep voltages to cause the signals from the plurality of receivers to be stored along a single storage path on the mica target of each storage tube during its respective storage period, and also operate in a manner so that irrespective of which of the plurality of receivers a signal is coupled from, the position of each stored signal along the storage path is proportional to the ground range from the radar of the corresponding target. Each of the sweep chopper circuits operates in response to the successively occurring sweep voltagees of FIGS. 3D and 3E to cause a storage tube electron beam to successively traverse different lengths of the storage path, these different lengths along the storage path being directly proportional to the amplitudes of the respective initiating sweep voltages. Because the successive sweeps of a storage tube electron beam are along different lengths of the storage path and because these successive sweeps over different lengths of the storage path are accomplished in equal time intervals, the velocity of the different sweeps are different, as will become clearer from the discussion which follows. The sweep chopper circuits also operate in response to the read-out sweep voltages to cause all of the stored signals in a storage tube to be read off and erased with a single sweep of the electron beam. The single read-out sweep of each storage tube, which occurs during substantially th entire non-storing period of the tube, has the effect of combining in the output signal of one storage tube the signals from the plurality of receivers which were stored during a plurality of storage sweeps.

The single storage path in each tube may take substantially any desired shape so long as the range information of the individual signals is preserved. In a system constructed according to the present invention the signals were stored along a circuitous path on the mica surface in order to obtain greater resolution from the storage tubes.

For the purpose of simplifying the explanation which follows, the operation of just one sweep chopper circuit will be considered since the two circuits are identical. Additionally, just one radar sweep voltage will be considered in the explanation of the circuit.

FIG. 4 is a block diagram of an exemplary sweep chopper circuit wherein the input voltage, FIG. 5a, is applied to input terminal 50. The narrow sawtooth sweep voltage of FIG. 5a represents the radar sweep voltage which occurs during the sampling of the receiver which is coupled to the lower-most beam, and the elongated sweep voltage represents a read-out sweep voltage. The input waveform 5a is coupled directly to adding circuit 51, adding circuit 56, and is also coupled to inverter 52, a conventional D.C. amplifier, where it is amplified and inverted and then coupled to clipper 53. Clipper 53 is a biased diode, for example, which clips the base of the amplified and inverted waveform and produces output waveform 5b. Waveform 5b is coupled to adder 51 and is also coupled to inverter 54, a D.C. amplifier, where it is again amplified and inverted. Clipper 55 clips the peak of the output waveform from inverter 54 and produces the waveform of FIG. 5c, which is in turn coupled to adders 51 and 56. Clipper 55 may be a shunt-connected biased diode, for example.

Adder 51 adds the waveforms a, b and c and produces output waveform 5d which is applied to the vertical deflection plates of the storage tube 42. Adder 56 adds waveforms a and c and produces output waveform 5e which is coupled to the horizontal deflection plates of the storage tube. Adding circuits 51 and 56 may be of any conventional type, one example being the parallel resistor circuit shown in FIG. 18.1 on page 631 of "Waveforms," published by McGraw Hill Book Company, Inc., 1949.

The shapes and magnitudes of waveforms d and e are chosen so that the electron beam of the storage tube will be deflected along a circuitous path which has the shape substantially as shown in FIG. 6b. By deflecting the electron beam of the storage tube along the circuitous path on the storage surface of the storage tube, the length of the storage path is increased to approximately twice the diameter of the storage surface and greater resolution is obtainable from the storage means.

All circuits in sweep choppers 39 and 40 are D.C. coupled to assure that the output waveforms are functions of the amplitudes only of the input waveforms. As a result of this, each of the radar sweep voltages of different amplitudes, FIG. 3C, will cause the storage tube electron beam to traverse a different length of the circuitous storage path. This may be demonstrated by referring to FIG. 6, wherein FIG. 6a illustrates the radar sweep voltages of different amplitudes which occur during a storage interval. The plurality of sweep voltages illustrated in FIG. 6a all have equal time durations. FIG. 6b represents the circuitous path an electron beam follows on the storage surface of a storage tube in response to the sweep voltages and the read-out voltages. The first radar sweep has an amplitude o–e, FIG. 6a, and the sweep chopper circuit causes the electron beam to traverse the path o–e, FIG. 6b, as explained above. The second radar sweep has an amplitude o–d and will cause the electron beam to traverse the length of the path represented by o–d, FIG. 6b. The length of the path traversed by the electron beam continues to decrease with each successive radar sweep until the fifth sweep causes the electron beam to traverse only the length of path o–a. The read-out sweep voltage has an ampltude o–f and the sweep chopper circuit will cause the electron beam of the tube to traverse the entire length of the path o–f, FIG. 6b.

Because it has been assumed in this discussion that the amplitudes of the radar sweep voltages are proportional to the cosines of the angles of the different antenna beams, the distances along the path of FIG. 6b are proportional to ground range from the radar. It will be seen by referring to FIGS. 6a and 6b that the successive sweep voltages are of different amplitudes and thus cause a storage tube electron beam to successively sweep over different lengths of the storage path. Because the sweep voltages of FIG. 6a are illustrated as having equal time durations and cause the electron beam to traverse different lengths of the storage path, FIG. 6b, it follows that the successive sweeps of the electron beam over the different lengths of the storage path are at different velocities.

To obtain optimum uniform resolution of targets and to preserve the optimum accuracy of range information, the sweep chopper circuits 39 and 40 may be constructed to cause the respective electron beams to move with constant velocity during each of their successive sweeps over different lengths of the storage path. For instance, the first sweep voltage of FIG. 6a causes a storage tube electron beam to travel at a uniform velocity over the length of storage path $o$–$e$, FIG. 6b, and the fifth sweep voltage of FIG. 6a causes the electron beam to travel at a uniform velocity over the path length $o$–$a$, it being understood that these two velocities are different from each other. To assure that the electron beam travels at a constant velocity during each sweep of the storage path, the break-points and the relative multitudes of the waveforms of FIGS. 5d and 5e may be chosen to produce this result.

As mentioned previously, the storage path may take a different shape if so desired, so long as the velocity of each sweep is maintained substantially uniform. Standard wave-shaping practices, such as employed above, may be followed to produce sweep voltages which will cause the electron beam to follow a different path.

*Storage Tube Video Signals*

Referring once more to FIG. 2, the radar video signals from the sequentially sampled receivers 15 are coupled on lead $a$ to gates 43 and 44. Voltage waveforms B and A, are also coupled to gates 43 and 44, respectively, so that gate 44 passes the radar video signals occurring during the first storage period and gate 43 passes the video signals occurring during the next succeeding storage period. The video signals passed by gate 44 are combined with waveform B in mixer 46 and produce the waveform of FIG. 3H which is coupled to the control grid of storage tube 42. The negative portion of waveform H is sufficient to bias storage tube 42 to cut-off and the video signals cause electron-beam current to be turned on during their occurrence. During the succeeding storage period waveform H is positive and the electron beam is on during the entire period. The video signals occurring during the second, or next succeeding, storage period are passed by gate 43 and are mixed with waveform A in mixer 45 to produce the waveform of FIG. 3G. This waveform is coupled to the control grid of storage tube 41 and causes the electron beam of that tube to be on during the entire first storage period and to be modulated by the video signals during the next succeeding storage period.

Referring to waveforms 3F and 3H, it is seen that the video signals occurring during the first period will be stored along the different lengths of the storage path of tube 42, and during the next succeeding period the stored signals will be read-off the storage surface of that tube. Reference to the waveforms 3E and 3G shows that the sequence is reversed in tube 41. Because distance along the lengths of the storage paths is proportonal to ground range, the positions of the stored signals on the storage paths are proportional to the ground range of the corresponding targets.

Read-write switches 90 and 91, FIG. 2, enable the storage tubes to store signals during one interval and read off the stored signals on the next interval. The two switching circuits are identical so that the operation of only one circuit, 91 for example, will be explained, it being understood that two circuits perform similar functions during alternate storage periods. Referring to FIG. 7, waveform 3A is coupled from input terminal 60 to grids 61 and 62 of tubes $V_1$ and $V_2$. Cathodes 63 and 64 are coupled to ground by resistors 65 and 66, respectively. Plate 67 of tube $V_1$ is coupled to B+ supply source by resistors 68 and 69, and plate 70 of tube $V_2$ is similarly connected to B+ by resistors 71 and 72. Diodes 73 and 74 shunt resistors 69 and 72, respectively, while condenser 75 shunts resistor 71. Plate 76 of storage tube 42 is coupled to a point between resistors 68 and 69, and the barrier screen grid 77 of storage tube 42 is coupled to the plate 67 of tube $V_1$.

Tubes $V_3$ and $V_4$ comprise a conventional difference amplifier of the type shown in FIG. 6–22, page 116 of "Electron Tube Circuits" by Seely, published by McGraw Hill Book Company, Inc. Resistors 69 and 72 of FIG. 7 correspond to the grid bias resistors shown in the reference.

In operation, the voltage waveform 3A from bistable multivibrator 24 is applied to grids 61 and 62 and renders both tubes conductive during the first storage period. Current flow through tube $V_1$ produces a voltage drop of approximately 50 volts across resistor 68 and thus establishes a fixed potential difference of that amount between plate 76 and barrier grid 77 of storage tube 42. During this first interval, video signals are stored on the mica storage surface 78 in the form of electrical charges. During this storage interval diodes 73 and 74 shunt the current flow around resistors 69 and 72, respectively. However, because diode 73 has a small finite forward resistance there will be a small voltage drop developed thereacross which is coupled to the grid of tube $V_3$. To remove this step from the signal output an identical circuit associated with tube $V_2$ causes a similar voltage to be coupled to the grid of tube $V_4$, and this voltage is cancelled in the difference amplifier $V_3$, $V_4$.

Corresponding circuit elements associated with tubes $V_1$ and $V_2$ are substantially identical so that the operation of the circuits of the two tubes will be as similar as possible. For this purpose condenser $C_1$ simulates the capacitance between plate 76 and grid 77 of storage tube 42.

During the next succeeding storage period waveform 3A is negative and tubes $V_1$ and $V_2$ are non-conducting. This removes the potential difference between the plate 76 and grid 77 of the storage tube 42, and as the electron beam of the tube traverses the entire length of the storage path during the read-off sweep the storage surface is discharged, causing a signal current to flow through resistor 69, thus developing the read-off output voltage thereacross. This voltage is coupled to the grid of tube $V_3$, and since there is no corresponding signal on the grid of tube $V_4$, the read-off voltage will appear at output terminals 79 of the difference amplifier.

The read-write switch 90 associated with storage tube 41 operates in a similar manner in alternation with switch 91.

The read-off signals of read-write switches 90 and 91, FIG. 2, are coupled to gates 80 and 81, respectively. Voltage waveforms 3A and 3B are also respectively coupled to gates 80 and 81 and cause said gates to pass the read-off signals from storage tubes 41 and 42 to mixer 82 during the first and next succeeding periods, respectively. The output of gate generator 35, FIG. 3J, is also coupled to gates 80 and 81 and renders the gates inoperative during a short period of time at the beginning of each period. This is to allow time for transients in the read-write switching circuits 90 and 91 to die out and prevents them from being passed to the cathode-ray tube indicator. This feature, however, is not necessary for the successful operation of the system, and may be omitted if so desired.

Read-off signals from gates 80 and 81, which occur during successive storage periods, respectively, are combined in mixer 82 and are coupled to the cathode 83 of cathode-ray tube indicator 85. The output of gate generator 35, FIG. 3J is coupled to control grid 84 of indictor tube 85 so as to turn the beam on during the time that read-off signals are received from mixer 82.

Resolver system 87 receives input sweep voltages from read-out sweep generator 36, FIG. 3D and provides deflection voltages to the deflection coil 86. Thus the signals are displayed on the cathode-ray tube screen at the same rate as they are read off the storage surfaces, and since the position of the stored signals on the storage paths was proportional to ground range, their positioning on cathode-ray tube 85 will also be proportional to ground range. Resolver 87 is mechanically coupled to motor 14, FIG. 1, and provides the means for producing a P.P.I. type of indication on the display screen of indicator tube 85.

Thus signals from the successively sampled receivers are stored at a relatively fast speed along storage paths in the first and second storage tubes, respectively, during alternate storage periods, and are alternately read off and displayed on the cathode-ray tube once each storage period at a relatively slow speed, resulting in the light intensity of the video display being increased by a factor approximately equal to the ratio of the speed of the storage sweeps to the speed of read-off sweeps. In the example assumed, the ratio would be 5 to 1.

It has also been demonstrated that a high degree of accuracy and resolution may be achieved in the storage means by storing the output signals from the sequentially sampled receivers along different lengths of a single circuitous storage path, wherein the length of storage path traversed by the storage tube electron beam during the sampling of any given receiver is directly proportional to a function of the elevation angle of the beam being sampled, and wherein the electron beam moves with a constant velocity along each of the different lengths of path.

Although the invention has been described in connection with a multi-beam radar system, it will be obvious to those skilled in the art that it may be practiced in any system where an appreciable amount of "dead-time" is present. For example, the present invention may be practiced in a single-beam radar system which is intended to cover a relatively short range, and which has a relatively long time interval between transmitted pulses in relation to the time interval required to receive an echo pulse from the most distant target of interest.

The operation of a single beam system would be similar to the operation of one channel of the multi-beam system except that the "dead-time" is due to short range coverage and the long interval between pulses rather than because of time sharing of a single indicator means between several receivers.

The relationship of the storage sweep and the read-off sweep of a storage tube in a single beam system is illustrated in FIG. 8, wherein the pulses $t$ represent transmitted pulses, the waveform $s$ represents a storage sweep, and the waveform $r$ represents a read-off sweep which endures for substantially the entire time interval between transmitted pulses.

The single beam system will also employ two storage tubes which operate in sequence, one storing received signals along a storage path produced by storage sweeps on one tube while the signals which were previously stored in the second storage tube are read off as the electron beam traverses the storage path at a slow speed in response to the long read-off sweep $r$. The single beam system may employ gating circuits, sweep chopper circuits, and read-write switching circuits similar to the ones previously disclosed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an object detection system the combination including a transmitter for providing recurring pulses of radio frequency waves which are separated by substantially equal intervals of time, antenna means coupled to said transmitter and comprising a plurality of vertically aligned radiators having different elevation angles for radiating said pulses and for receiving reflected pulses in a plurality of vertically-stacked radiation beams, a plurality of radio frequency receivers coupled respectively to said radiators for producing output signals in response to said reflected waves, first and second electron-beam storage tubes for storing said signals in the form of electrical charges on storage surfaces in said tubes, means for sequentially sampling the output signals of a different one of said receivers during each successive interval between transmitted pulses, means for transferring said signals to the storage surface of said first storage tube and then said second storage tube during first and second successive storage periods, respectively, each of said signal storage periods being equal to the total time interval required to successively sample all of said receivers once, means operable on each storage tube during its signal storage period for deflecting the beam of the respective tube at a constant rate along a different length of a storage path on said storage surface each time one of said receivers is sampled, the length of the path traversed by said electron beams during the sampling of a given receiver being a function of the elevation angle of the radiator to which that receiver is coupled, means for deflecting the beam of each of said storage tubes over the entire length of said storage path at a uniform rate once during each period of time when the respective tube is not storing said signals, a cathode-ray tube indicator for providing a visual display of said signals, and means for alternately transferring the stored signals from said storage tubes to said indicator tube, said last-named means being operable on each storage tube during its non-storing period.

2. A radar system comprising a pulsed transmitter for providing recurrent pulses of radio frequency energy which are separated by substantially equal intervals of time, stacked-beam antenna means including a plurality of radiators coupled to said transmitter for simultaneously radiating each of said pulses in a plurality of elevationally-stacked beams, a plurality of receivers coupled respectively to said radiators for producing output signals in response to pulses of reflected energy, first and second storage tubes each having electron-beam producing means, electron-beam deflection means, a control grid, and a storage surface for storing signals in the form of electrical charges thereon, a cathode-ray tube indicator means having an electron-beam producing means, electron-beam deflection means, and a display screen, means for sequentially sampling the output signals of a different one of said receivers during each successive interval between transmitted pulses, means for coupling said signals to the control grid of said first storage tube and then said second storage tube during first and second successive storage periods, respectively, each of said storage periods being equal to the total time interval required to successively sample each of said receivers once, means synchronized with the receiver connecting means and operable on the storage tube to which the receivers are connected during a given storage period for deflecting the electron beam of said storage tube along a different length of a storage path on the storage surface each time one of said receivers is connected to said tube, said last-named means causing the electron-beam to traverse each of the different lengths of a path at a uniform velocity, whereby signals from the individual receivers are stored along different lengths of said path during said given storage period, said last-named means also causing the length of the storage path traversed by said electron beam during the sampling of a given receiver to be a function of the elevation angle of the radiated beam to which that receiver is coupled, means operable on each storage tube during its non-storing period for deflecting the beam of the tube over the entire length of the storage path at a uniform velocity throughout the duration of said period, means operating in synchronism with said last-named means for transferring signals stored on the storage surfaces of the respective tubes to the display screen of said cathode-ray tube indicator means, and means for deflecting the electron beam of said indicator means across the face of said display screen in synchronism with the transferring of signals from said storage surfaces to said indicator means.

3. In an object detecting system the combination including a transmitter for providing recurrent pulses of radio frequency waves which are separated by substantially equal intervals of time, antenna means coupled to said transmitter and comprising a plurality of radiators having different elevation angles and arranged to radiate said waves and receive reflected waves in a plurality of vertically-stacked beams, a plurality of radio frequency receivers respectively coupled to said radiating means for generating output signals in response to said reflected waves, means for sampling the output signals from a different one of said receivers during each successive interval between transmitted pulses, means for providing a sweep voltage concurrently with the sampling of each of said receivers, the amplitude of the sweep voltage occurring during the sampling of any given receiver being a function of the elevation angle of the radiator which is coupled to that receiver, first and second electron-beam storage tubes having storage surfaces for storing said output signals in the form of electrical charges thereon, means including said storage tubes for storing the sampled output signals of said receivers on said first storage tube during a first storage period which is equal in time to the time required to sample each of said receivers once, and for storing the sampled output signals of said receivers on said second storage tube during the next succeeding storage period which is equal in time to said first storage period, means responsive to the amplitudes of said sweep voltages for successively deflecting the beam of said first tube during said first storage period at uniform rates along different lengths of a storage path on said storage surface and for deflecting the beam of said second tube in a like manner during the next succeeding storage period, said last-named means additionally providing means for causing the beams of the first and second tubes to traverse the entire lengths of said paths at a uniform rate once during the second and first storage periods, respectively, electron beam indicating means for providing a visual display of said received signals, and means for alternately transferring said storage signals from said second and first storage tubes to said indicating means during said first and next successive storage periods, respectively.

4. In an object detecting system the combination comprising a transmitter for providing pulses of radio frequency waves which are separated by substantially equal intervals of time, antenna means coupled to said transmitter and comprising a plurality of radiators arranged to radiate each of said pulses in a plurality of vertically-aligned radiaton beams, a plurality of radio frequency receivers each being coupled to one of said radiators for producing output signals in response to reflected pulses from objects in space which are located in said beams, first and second electron-beam storage tubes for storing signals in the form of electrical charges on storage surfaces in said tubes, means for sequentially sampling the output of a different one of said receivers during each successive interval between transmitted pulses, means for generating a plurality of successively occurring different sweep voltages wherein each one of said sweep voltages occurs simultaneously with the sampling of one of said receivers and wherein the amplitude of the sweep voltage which occurs during the sampling of a corresponding receiver is a function of the angle of inclination of the radiated beam which is coupled to that receiver, means for coupling said sequentially sampled receivers to said first and then said second storage tube during respective first and second succeeding storage periods, wherein the time of each storage period is equal to the total time required to sample each of said receivers once, means operable on said first and second storage tubes simultaneously with said last-named means for deflecting the electron beam of each tube along a different length of a circuitous path on the storage surface in response to each of said sweep voltages, whereby the output signals from the different receivers are stored along different lengths of the storage path in the first tube during the first storage period and along different lengths of the storage path in said second tube during the next succeeding storage period, means operating on each tube during its non-storing period for deflecting the beam of the tube over the entire length of its storage path a single time throughout the duration of that period, whereby signals stored during the previous storage period are read off and erased, a cathode-ray tube indicator having electron beam forming means, and means for transferring said read-off signals from said storage tubes to said cathode-ray tube during each of said periods, and means for deflecting the electron beam of the cathode-ray tube once during each of said periods.

5. A radar system, comprising, a pulsed transmitter for providing recurrent pulses of radio frequency energy which are separated by substantially equal intervals of time, stacked-beam antenna means for simultaneously radiating each of said pulses in a plurality of elevationally stacked-beams, a plurality of receivers each being coupled to receive energy from one of said beams and each producing output signals in response to energy reflected from objects in space located in a corresponding beam, first and second storage tubes each having electron-beam producing means, electron-beam deflection means, a control grid, and a storage surface for storing signals in the form of electrical charges thereon, a cathode-ray tube indicating means having an electron-beam producing means, electron-beam deflection means and a display screen, means for sequentially connecting a different one of said receivers to the control grid of one of said storage tubes during each successive interval of time between transmitted pulses, the total time required to sequentially connect said receivers to said first storage tube comprising a first storage period, means for sequentially connecting each of said receivers to the control grid of said second storage tube in a similar manner during a second substantially equal storage period which succeeds said first storage period, sweep voltage generating means synchonized with the receiver connecting means for providing a sweep voltage during each interval between transmitted pulses, the sweep voltage occurring simultaneously with the connection of a given receiver to one of said storage tubes having an amplitude which is a function of the elevational angle of the radiation beam to which that given receiver is coupled, first and second deflection voltage generating means coupled to the deflection means of said first and second storage tubes, respectively, and responsive to said sweep voltages for providing deflection voltages which cause the electron beams of said storage tubes to be deflected along a different length of storage path on said storage surfaces in response to each of said sweep voltages, said last-named means causing the electron beam of the storage tube to traverse each of the different lengths of storage path at uniform velocities, whereby signals from each of said receivers are stored along different lengths of said path, said deflection voltage generating means being operable on each of said storage tubes during their respective storage periods, means including said deflection voltage generating means operable on each storage tube during its non-storing period for deflecting the beam of the tube over the entire length of the storage path at a uniform velocity throughout the duration of that period, means operating in synchronism with said last-named means for transferring signals stored on the storage surfaces of the respective storage tubes to the display screen of said cathode-ray tube indicator means, and means for deflecting the electron-beam of said indicator means across the face of said display screen in synchronism with the transferring of signals from said storage surfaces to said indicator means.

6. In an object detection system the combination including a transmitter for providing recurring pulses of radio frequency waves which are separated by substantially equal intervals of time, antenna means coupled to said transmitter and comprising a plurality of vertically aligned radiators having different elevation angles for radiating said pulses and for receiving reflected waves in a plurality of vertically-stacked radiation beams, a plurality of radio frequency receivers coupled respectively to said radiators for producing output signals in response to said reflected waves, first and second electron-beam storage tubes for storing said signals in the form of electrical charges on storage surfaces in said tubes, means for sequentially sampling the output signals of a different one of said receivers during each successive interval between transmitted pulses, means for transferring said signals to the storage surface of said first storage tube and then said second storage tube during first and second successive storage periods, respectively, each of said signal storage periods being equal to the total time interval required to successively sample all of said receivers once, a plurality of sweep voltage generating means equal in number to the number of said receivers, each of said sweep voltage generating means generating a sawtooth sweep voltage during each interval between transmitted pulses, a sequentially operating gating means for passing a different one of said sweep voltages during each successive interval between transmitted pulses, the sweep voltage which is passed simultaneously with the sampling of any given receiver having an amplitude which is proportional to a function of the elevation angle of the radiation beam to which the simultaneously sampled receiver is coupled, first and second deflection voltage generating means coupled respectively to the deflection means of said first and second storage tubes, each of said deflection voltage generating means being comprised of direct coupled waveshaping circuits adapted and arranged to deflect the electron beam of said storage tubes at uniform velocities over different lengths of a storage path on the storage surfaces of said tubes in response to sweep voltages of different amplitudes, means for coupling said sawtooth sweep voltages to the first and then the second deflection voltage generating means during the first and second storage periods, respectively, whereby the beam of the respective storage tube is deflected along a different length of said storage path at a uniform velocity each time one of said receivers is sampled, a read-out sweep voltage generating means for generating a recurrent sawtooth voltage having a period equal to one of said storage periods, and means for coupling said read-out sweep voltage to said first and then the second deflection voltage generating means during the non-storing period of said first and second storage tubes, respectively, said read-out sweep voltage causing the storage tube electron beams to traverse the entire lengths of said non-linear paths, and means for alternately transferring the stored signals from said storage tubes to a cathode-ray indicator tube, said last-named means being operable on each storage tube during its non-storing period.

7. In an object detecting system the combination comprising a source for providing pulses of electromagnetic energy, radiating means coupled to said source for radiating each of said pulses in a plurality of radiation beams, said beams having fixed spacial relationships with respect to each other, a plurality of electromagnetic wave receiving means each coupled to a respective radiator for producing output signals in response to pulses of electromagnetic waves received by said radiating means, first and second electron beam storage tubes for storing signals in the form of electrical charges on storage surfaces in said tubes, means for sequentially sampling the output of a different one of said receiving means during each successive interval between radiated pulses, means for generating a plurality of successively occurring sweep voltages wherein each one of said sweep voltages occurs simultaneously with the sampling of a respective one of said receivers and wherein the amplitude of the sweep voltage which occurs during the sampling of a respective receiver is a function of the orientation of the radiation beam which is coupled to that respective receiver, means for coupling said sequentially sampled receivers to said first and then said second storage tube during respective first and second succeeding storage periods, the time of each storage period being equal to the total time required to successively sample each of said receivers once, means operable on said first and second storage tubes simultaneously with said last-named means for successively deflecting the electron beam of each tube along a path on the storage surface in response to said successively occurring sweep voltages, whereby the output signals from the different receivers are stored along the storage path in the first tube during the first storage period and along the storage path in said second tube during the next succeeding storage period, means operating on each storage tube during its non-storing period for deflecting the beam of the tube over the length of its storage path a single time throughout the duration of that period, and means operating on the respective storage tubes during their respective non-storage intervals for transferring signals stored along the respective storage path during the previous storage period.

8. In combination, a source providing recurrent pulses of electromagnetic waves, means coupled to said source for radiating said pulses and for receiving pulses of electromagnetic energy, receiving means coupled to said radiating means for producing output signals in response to pulses of electromagnetic energy received by said radiating means, first and second storage means each adapted to store signals from said receiving means and to subsequently transfer said stored signals to an indicating means, means coupling said receiving means to said first storage means during a fractional portion of a first interval of time and for coupling said receiving means to said second storage means during a fractional portion of a next succeeding interval of time substantially equal to said first interval of time, said fractional portion of an interval of time being the time period between the time a pulse is radiated from said radiating means and the time a reflection of that pulse is received from a most distant target of interest, whereby said first storage means stores signals produced by said receiving means during the fractional portion of said first time interval and said second storage means stores signals produced by said receiving means during the fractional portion of said second interval of time, means operable on said first storage means for the duration of said second time interval for transferring signals stored therein to an indicating means and means operable on said second storage means for the duration of said first time interval for transferring signals stored therein to said indicating means.

9. Means for increasing the intensification of a video display comprising means for receiving input information signals and producing respective output information signals, first and second storage means each adapted to store information signals and to subsequently transfer said stored signals to an indicating means, means for coupling said first storage means to said receiving means during a fractional portion of a first time interval and for coupling said second storage means to said receiving means during a fractional portion of a next succeeding time interval substantially equal to said first time interval, a cathode-ray tube indicating means, and means operating for substantially the duration of said first time interval to transfer stored signals from said second storage means to said cathode-ray tube indicator means and operating for substantially the duration of said second time interval to transfer stored signals from said first storage means to said cathode-ray tube indicating means.

10. In an object detection system the combination including a transmitter for providing pulses of radio frequency waves, antenna means coupled to said transmitter for radiating said pulses and for receiving pulses reflected from remotely located objects, receiver means coupled to said antenna for producing output signals in response to said received reflected pulses, first and second storage means for storing signals from said receiver, means for storing signals from said receiver in said first storage means during a storage period after alternate transmitted pulses and for storing signals from said receiver in said second storage means during a storage period after intervening alternate transmitted pulses, said storage period being less than the time interval between transmitted pulses, an indicator means for providing an indication of received pulses, and means for transferring signals from said second storage means to said indicator means throughout substantially the entire period of time following said alternate transmitted pulses and for transferring signals from said first storage means to said indicator means throughout substantially the entire period of time following said intervening alternate transmitted pulses.

References Cited in the file of this patent
UNITED STATES PATENTS
2,822,536  Sandretto _____ Feb. 4, 1958